United States Patent [19]
English

[11] Patent Number: 5,841,204
[45] Date of Patent: Nov. 24, 1998

[54] TEMPERATURE CONTROL SYSTEM AND METHOD

[76] Inventor: Larry G. English, 2625 Heritage Landing, St. Charles, Mo. 63303

[21] Appl. No.: 822,779

[22] Filed: Mar. 21, 1997

[51] Int. Cl.[6] .................................................. H01H 37/00
[52] U.S. Cl. .......................... 307/117; 307/116; 374/112; 374/132; 219/494
[58] Field of Search ...................................... 307/117, 116; 219/497, 608, 482, 494; 126/587, 597; 165/287; 374/132, 112; 230/781 D

[56] References Cited

U.S. PATENT DOCUMENTS

| | | | |
|---|---|---|---|
| 3,903,395 | 9/1975 | Hamstra | 219/497 |
| 4,175,418 | 11/1979 | Steffen et al. | 374/112 |
| 4,325,225 | 4/1982 | Price | 236/78 D |
| 4,906,820 | 3/1990 | Haarmann et al. | 219/497 |
| 4,970,373 | 11/1990 | Lutz et al. | |

OTHER PUBLICATIONS

J.T. Humphries and L.P. Sheets/Industrial Electronics, Third Edition/pp. 343–346.

W.R. Devenport/Experiments For Industrial Electronics, Third Edition/pp. 166–168.

National Semiconductor Corporation/Linear Databook 2/pp. 6–4 & 6–11.

*Primary Examiner*—Jeffrey A. Gaffin
*Assistant Examiner*—Albert W. Paladini
*Attorney, Agent, or Firm*—Polster, Lieder, Woodruff & Lucchesi

[57] ABSTRACT

A temperature control system and method for regulating the temperature of an external device or load is provided which maintains the actual ambient temperature of the external device at a desired set point temperature. The temperature control system includes a solid state temperature sensing device for sensing the actual temperature of the external device, and generating a sensor output voltage proportional to the actual temperature. An adjustable voltage dividing circuit generates a temperature compensated set point voltage proportional to the desired temperature. A fixed voltage dividing circuit generates a reference voltage having a predetermined magnitude. A first comparator compares the set point voltage to the sensor output voltage, and generates an output signal indicating whether the sensor output voltage is maintained at the set point voltage. A second comparator detects whether the external device is maintained in an "off" or "on" state by comparing the set point voltage to the reference voltage. A solid state switching device is activated or deactivated based on the voltage levels of output voltages generated by the first and second comparators. The switching device, in turn, controls the operation of a relay. When the switching device is deactivated, the relay is maintained in a normally open position, blocking current flow therethrough to deenergize the external device. When the switching device is activated, the switching device allows current flow therethrough and the relay is maintained in a closed position. When the relay is maintained in the closed position, a power supply energizes the external device.

18 Claims, 3 Drawing Sheets

TEMPERATURE CONTROL SYSTEM AND METHOD

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to temperature control, and in particular a system and method for controlling temperature of an external device or load such that the actual temperature of the external device is maintained at a desired predetermined set point temperature. The present invention is directed generally to external devices such as commercial brewing equipment for beverages such as coffee or tea, commercial food preparation and cooking equipment, commercial and consumer cooling and refrigeration equipment, commercial and consumer heating and ventilating equipment and other end products that presently use mechanical devices for the control of temperature.

Either a bimetallic device or a capillary devices is commonly used to maintain the temperature of these types of external devices at a desired set point temperature by controlling the supply of voltage to the external device. The bimetallic device is an actuating element comprising two strips of metal having different coefficients of thermal expansion that are bonded together. When ambient or supplemented sources of heat or cold are applied to the bimetallic device, the internal strains caused by the temperature change bend the compound strip. Bending of the bimetallic device opens or closes a set of electrical contacts which are operatively connected to the external device when maintained in a closed position. Thus, the selective application of sources of heat or cold to the bimetallic device allows for control of the supply voltage to the external device. Adjustment of the set point temperature is accomplished by a shaft-cam assembly that either separates or pre-loads the contacts, and determines the amount the bimetallic element must bend (or the temperature must change) to effect a change in the electrical contact state.

The capillary tube device includes a tube that interconnects a metal bulb and bellows, electrical contacts operatively connected to the external device when maintained in a closed position, and a shaft-cam assembly. The bulb, tube and bellows are filled with a liquid or gas having known and predictable expansion vs. temperature characteristics. When the bulb containing the largest percentage of the liquid or gas is exposed to an increase or decrease in ambient temperature, the resulting expansion or contraction of the liquid or gas is transmitted to the bellows via the interconnecting tube, producing an increase or decrease in the length of the bellows. The length of the bellows determines whether the electrical contacts are maintained in an open or closed position. The shaft-cam assembly controls the temperature change that the bulb experiences, thereby controlling the length of the bellows, the position of the electrical contacts and the activation of the external device.

Other known temperature control devices include a thermistor device which is a semiconductor device whose electric resistance changes exponentially with changes in temperature. When incorporated in an electrical bridge circuit, changes in temperature provide an arbitrary voltage that when compared to an adjustable voltage source can be used to turn on or off a relay or solid state switching device that then turns on or off an external device.

Advantages of the bimetallic and capillary mechanical devices include moderate reliability, small size and low costs. However, such devices also include the disadvantages of mechanical wear which results in a shift of the set point temperature over time, an increase in the number of operations required to control the temperature, and an increase in hysteresis or extreme variations about the set temperature. In capillary devices, the bellows temperature can change the set point temperature. For example, if the set point temperature is 200° F. at room temperature, when the bellows reach 150° F., the set point temperature can drift as much as 10° F. In addition, the set point temperature for a capillary device must be recalibrated at high altitudes such as Denver.

The thermistor device is high reliability and minimum drift of the temperature over the device's operating life. For example, commercial units are available which drift by no more than 0.01° C. per year. However, disadvantages include its large size and high cost since thermistors are typically two to four times more expensive than the mechanical devices.

Additional disadvantages associated with these three temperature control devices include that they are unable to monitor the actual temperature of an external device, and they can only provide an approximate calibrated adjustment for the set point temperature. For example, the capillary device used in many commercial and residential ovens for temperature control can provide inaccuracies as much as 50° F. from the adjustment reading and additional temperature variances as great as 50°–75° F. between the desired and actual temperatures at which the heating elements turn on and off.

BRIEF SUMMARY OF THE INVENTION

Accordingly, one object of the present invention is to provide a temperature control system that controls the temperature of an external device with a high degree of precision.

Another object of the present invention is to provide temperature control system that allows for selection of maximum and minimum set point temperatures for an external device.

Still another object of this invention is to provide a temperature control system that allows for manually varying a desired set point temperature within a predetermined range.

A further object of this invention is to provide a temperature control system that monitors a set point voltage corresponding to the desired set point temperature and a sensor output voltage of a solid state sensor corresponding to the actual temperature of the external device with an external voltage measuring device such as a digital voltmeter or an internal voltage measuring device.

Yet another object of this invention is provide a temperature control system having minimal hysteresis the actual temperature of the external device with respect to the set point temperature.

Further objects of this invention are to provide an system which has a minimal drift about the set point temperature of ±1° F. from room temperature to 150° F.

Additional objects include providing an system that is economical to produce and allows for convenient installation or replacement in any external device or load.

In accordance with the invention, generally stated, a temperature control system for regulating the temperature of an external device is disclosed which includes a temperature sensing apparatus disposed in a heat transfer relationship with the external device for generating an output signal having a variable magnitude. The output signal is representative of the actual ambient temperature of the external device. An adjustable signal generating circuit is provided for generating a set point signal having a manually adjustable magnitude within a predetermined range. The set point signal is representative of a desired temperature for the external device. A fixed reference signal generating circuit is provided for generating a reference signal having a predetermined magnitude. The temperature control system also includes a first and second comparison devices. The first comparison device compares the magnitudes associated with the set point signal and the output signal generated by the temperature sensing apparatus, and generates an output signal having a first voltage level when the magnitude of set point signal is greater than or equal to the magnitude of the output voltage of the temperature sensing apparatus, and having a second voltage level when the magnitude of the set point signal is less than the magnitude of the output voltage of the temperature sensing apparatus. The second comparison device compares the magnitudes associated with the fixed reference signal and the set point signal, and generates an output signal having a first voltage level when the magnitude of the set point signal is greater than or equal to the magnitude of the reference signal, and having a second voltage level when the set point signal is less than the reference signal. Means is also provided for varying the temperature of the external device by selectively energizing and deenergizing the external device based upon the voltage levels associated with the first and second output signals. The temperature varying means energizes the external device when the output signals of the first comparison device and the second comparison device are maintained at the first voltage levels. The temperature varying means deenergizes the external device when the output signals of the first comparison device or the second comparison device is maintained at the second voltage level.

Yet another aspect of the present invention is a temperature control system for regulating the temperature of an external device that includes a temperature sensing device disposed in thermal communication with the external device for generating a variable output voltage proportional to the actual temperature of the external device. Electronic control circuitry is operatively connected to the sensing device for selectively energizing and deenergizing the external device to maintain the temperature of the external device at a desired set point temperature. A regulated DC voltage source is connected to the sensing device and the control circuitry for supplying a stable DC reference voltage to the sensing device and the control circuitry. An adjustable voltage dividing circuit is provided for generating a temperature compensated set point voltage within a predetermined range of voltage levels delimited by a maximum voltage level and a minimum voltage level. The set point voltage is proportional to the desired set point temperature for the external device. The adjustable voltage dividing circuit includes means for varying the set point voltage within the predetermined range. A fixed voltage dividing circuit is provided for generating a reference voltage having a predetermined voltage level slightly greater than the minimum voltage level obtainable for the set point voltage.

A first comparator is also included in the temperature control system for comparing the output voltage of the sensing device to the set point voltage of the adjustable voltage dividing circuit. The first comparator generates a first output voltage having a first level signal when the set point voltage is greater than or equal to the output voltage of the sensing device, and having a second level signal when the set point voltage is less than the output voltage of the sensing device. A second comparator is also provided for comparing the reference voltage of the fixed voltage dividing circuit to the set point voltage. The second comparator generates a second output voltage having a first level signal when the set point voltage is greater than or equal to the reference voltage, and having a second level signal when the set point voltage is less than the reference voltage.

A switching device also is included that has a gate terminal operatively connected to output terminals associated with the first comparator and the second comparator. The switching device is maintained in an on state allowing the flow of current therethrough when the first comparator and the second comparator generate the first level output voltages. The switching device is maintained in an off state preventing the flow of current therethrough when the first comparator or the second comparator generates the second level output voltage. A relay is also provided that has a coil connected to an anode terminal associated with the switching device, a switch contact operatively connected to an input terminal associated with the external device, and a switch having a normally open position and a closed position with respect to the switch contact. The switch is maintained in the normally open position when the switching device is maintained in its off state. The switch is maintained in the closed position when the switching device is maintained in its on state. A power supply is operatively connected to the external device when the relay is maintained in the closed position for energizing the external device.

Another aspect of the present invention is that of a method for controlling the temperature of an external device by selectively energizing the external device to maintain actual ambient temperature of the external device at a desired set point temperature which includes the steps of:

sensing the actual temperature of the external device;

generating a variable voltage having a variable voltage level representative of the actual temperature of the external device;

generating a set point voltage having an adjustable voltage level within a predetermined voltage range which is representative of the desired set point temperature for the external device;

generating a reference voltage having a predetermined voltage level;

determining whether the actual temperature of the external device is being maintained at the set point temperature by comparing the voltage levels of the variable voltage and the set point voltage;

determining whether the external device is being maintained in an off state or an on state by comparing the voltage levels of the reference voltage and the set point voltage;

energizing the external device when the external device is maintained in the on state and when the actual temperature of the external device is less than or equal to the desired set point temperature; and deenergizing the external device when the external device is maintained in the off state or when the actual temperature of the external device is greater than the desired set point temperature.

These and other objects and features will become apparent to those skilled in the art in light of the following disclosure and accompanying drawings.

BRIEF DESCRIPTION OF THE SEVERAL VIEW OF THE DRAWINGS

The objects of the invention are achieved as set forth in the illustrative embodiment shown in the drawings which form a part of the specification.

Corresponding reference characters indicate corresponding parts throughout the several views of the drawings.

DETAILED DESCRIPTION OF THE PREFERRED EMBODIMENT

Figure 1:
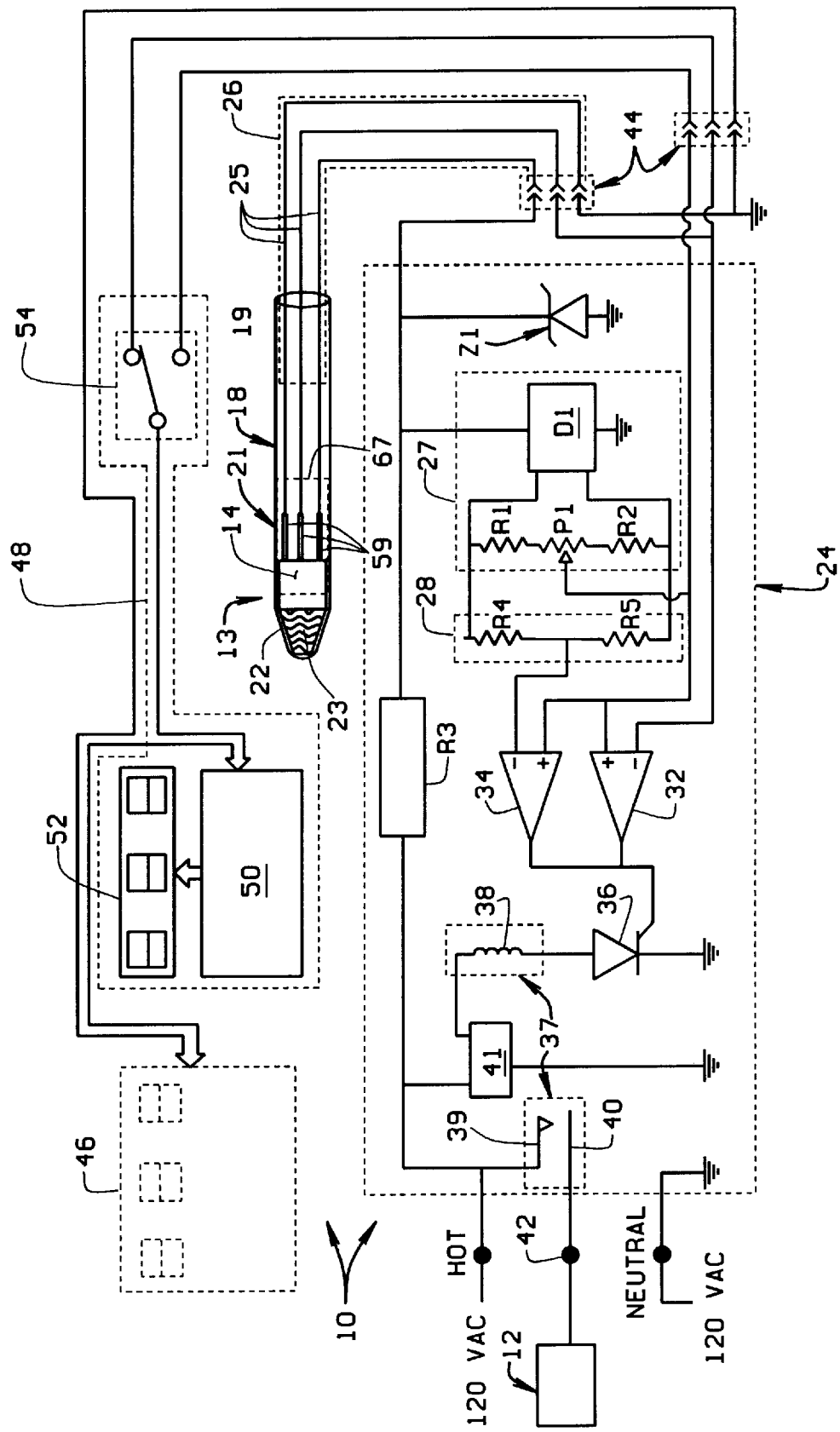
FIG. 1 is a schematic diagram of the circuitry employed in the temperature control system of the present invention.

Referring now to FIG. 1, there is shown a temperature control system, referred to generally as 10, of the present invention which controls the temperature of an external device or load 12. A temperature sensing device 13 is provided that includes a temperature sensor 14 for generating a variable voltage proportional to the actual ambient temperature of the external device 12. In the preferred embodiment, sensor 14 is a standard commercially available solid state sensing device having two semiconductor junctions that operate at different current densities, such as National Semiconductor Corporation's LM34 or LM35 series of temperature sensors. Sensor 14 compares the difference in voltage drop across these semiconductor junctions, and generates two voltages that are dependent upon ambient temperature. The difference in voltages is amplified by an internal preset gain amplifier to produce an output voltage that is proportional to the actual temperature of the external device 12 at a rate of 10 mV per °F. or °C. depending on the amplifier preset gain. U.S. Pat. No. 4,970,373, issued Nov. 13, 1990 to Lutz et al., discloses an electronic temperature control system for a tankless water heater which also suggests using National Semiconductor's LM34 as a temperature sensing device.

As shown in FIG. 1, the temperature sensing device 13 also includes a probe 18 having a metal or plastic housing 19, depending upon the environmental application. The sensor 14 is partially disposed within an electrically insulating sleeve 21 mounted inside the probe 18. A tip 22 of the housing 19 is maintained in thermal contact with the external device 12 upon operation of the temperature control system 10. The tip 22 can be filled with a thermally conductive, electrically insulating material 23 such as a silicone gel to improve the thermal coupling between the solid state sensor 14 and the tip 22 of the housing 19. The construction of the probe 18 is discussed in greater detail below with respect to FIG. 3. The sensor 14 is connected to electrical control circuitry 24 via interconnecting wiring conductors 25. The wires conductors 25 are bundled together inside a cable 26 as shown in phantom in FIG. 1. The cable 26 extends from the temperature sensing device 13 to the control circuitry 24. A zener diode Z1 supplies a regulated DC voltage to the sensor 14 and control circuitry 24.

FIG. 1 illustrates a schematic diagram of an embodiment of the control circuitry 24 that is mounted on a printed circuit board (not shown). The control circuitry 24 includes an adjustable voltage divider circuit 27 that generates a temperature compensated set point voltage over the range of voltages produced by the temperature sensor 14. The set point voltage is proportional to and representative of a desired set point temperature for the controlled external device 12. The adjustable voltage divider 27 includes a precision temperature compensated reference diode D1 connected in parallel with the zener diode Z1. The adjustable voltage divider 27 also includes a series combination of temperature compatible resistors R1 and R2 and a variable resistor P1 connected in parallel with the reference diode D1 as shown in FIG. 1. The resistance values of resistor elements R1 and R2 dictate the minimum and maximum set point voltages that can be generated by the adjustable voltage divider 27 for a given application. The variable resistance element P1 is connected in series between resistor R1 an R2 to allow for manual setting of the desired set point voltage (and therefore the desired set point temperature) either locally or remotely within the range of voltages delimited by the maximum and minimum obtainable set point voltages. A feedback resistor R3 limits the hysteresis of the actual temperature of the external device to ±1° C. or °F. of the set temperature. As will be discussed in more detail below, the external device 12 is either energized or deenergized based upon the resistance setting of the variable resistor P1.

A fixed voltage divider circuit 28 comprising two resistance elements R4 and R5 generates a fixed reference voltage having a predetermined magnitude. In the preferred embodiment, the magnitude of the reference voltage is nominally 5% greater than the magnitude of the minimum obtainable set point voltage that can be generated by the adjustable voltage divider 27.

The set point voltage generated by the adjustable voltage divider 27 is supplied to a first comparator 32 and a second comparator 34. The first comparator compares the output voltage generated by temperature sensing device 13 to the set point voltage to effectively determine whether the actual temperature of the external device 12 is maintained at the desired set point temperature. The comparator 32 generates a output signal having a first (or high) voltage level when the set point voltage is greater than or equal to the sensor output voltage, and having a second (or low) voltage level when the set point voltage is less than the sensor output voltage. The first voltage level indicates the actual temperature of the external device is at or below the desired set point temperature, while the second voltage level indicates the actual temperature of the external device exceeds the desired set point temperature.

The sensor 14 used in the preferred embodiment has a dominant failure mode in which the sensor is short circuited and generates a maximum sensor output voltage. For example, the sensor can be maintained in a shorted condition when the sensor overheats or if an excessive transient voltage is present (e.g., as a result of a lightening strike). In this situation, the first comparator generates an output signal at the second voltage level since the sensor output voltage is greater than the desired set point voltage.

The second comparator 34 compares the reference voltage generated by the fixed voltage divider 28 to the set point voltage to determine whether the external device 12 is turned on or off, and generates an output signal having a first or second voltage level based upon the on or off state of the external device 12, respectively. The second comparator 34 generates an output signal having a first (or high) voltage level when the set point voltage is greater than or equal to the reference voltage, indicating the external device is turned on. When the external device is turned off, the variable resistor P1 is turned to a fully counterclockwise position to obtain the minimum set point voltage. In this situation, the set point voltage is less than the fixed reference voltage, and the comparator 34 generates an output signal having a second (or low) voltage level. Thus, the second comparator monitors whether the external device is turned on or off based upon the setting of the variable resistor P1, and generates a first voltage level when the external device is turned on, and the second voltage level when the external device is turned off.

The output signals of comparators 32 and 34 are connected together and supplied to a gate terminal of a solid state switch 36. In general, the output signals generated by the comparators 32 and 34 control activation and deactivation of the switch 36. The solid state switch 36 may be a thyratron transistor (thyristor) such as a silicon-controlled rectifier (SCR) (as shown), or a triac (i.e., a bi-directional triode thyristor), a gate turnoff switch (GTO) thyristor, or a junction transistor. Activation or deactivation of the switch is controlled by the first and second comparators 32, 34. More specifically, when both output signals of the comparators 32, 34 are maintained at the first voltage levels, the switch 36 is activated and allows the flow of current therethrough since the voltage supplied to the switch 36 by the comparators 32, 34 exceeds a predetermined switch trigger voltage. The switch continues to conduct current until the first comparator 32 or the second comparator 34 generates an output signal having the second (or low) voltage level such that the switch 36 is reverse biased or turned off. In this situation, the voltage level applied to an anode terminal of the switch 36 falls below a predetermined level such that the switch is reverse biased and blocks the flow of current therethrough. The switch 36 will not conduct current until a first or high level output signal is supplied from the comparators 32 and 34 to the gate lead.

The switch 36, in turn, controls the activation of deactivation of a relay 37. The relay 37 shown in FIG. 1 is an electrically operated switch including a coil 38 and a magnetic reed switch 39. The anode terminal of the switch 36 is connected to the coil 38 as shown in FIG. 1. When the switch 36 is reverse biased or deactivated, no current flows through the switch 36 such that no voltage is generated across the coil 38. In this situation, the reed switch 39 is maintained in a normally open position as shown in FIG. 1 in disengagement with a switch contact 39. The external device 12 is operatively connected to the control circuitry 24 via switch contact 39. When the switch 36 is activated or turned on by a voltage supplied to its gate lead by either comparator 32, 34, sufficient voltage is supplied across the coil 38 such that the generated magnetic field forces the reed switch 39 into a closed position in electrical contact with the switch contact 40. When the relay is maintained in its closed position, the external device 12 is energized by a power supply 41 that supplies power to the external device 12 via the relay switch contact 40. When the reed switch 39 is maintained in its normally open position, no power is supplied to the external device 12 such that the external device 12 is deenergized.

The external device 12 is connected to the relay switch contact 40 at connection point 42. Connection point 42 provides means for connecting the electrical power source 41 to the external temperature controlled device 12 without passing large flows of electrical current through printed circuit board.

At least two connectors 44 allow for the connection of the sensor assembly 14 to the control circuitry 24. The connectors 44 also are used to connect either an external voltage measuring device 46 such as a digital voltmeter, or an internal voltage measuring device 48 to the control circuitry 24. These voltage measuring devices 46, 48 monitor the sensor output voltage and/or the set point voltage generated by the adjustable voltage divider 27 at a plurality of test points designated as A1, A2, A3, B1, B2 and B3 in FIG. 2. In the preferred embodiment, the internal voltage measuring device 48 is used which includes an analog to digital (A/D) converter 50 and associated electrical components which convert the sensor output voltage or the set point voltage into representative digital signals, and a digital LED or LCD readout display 52 which displays these digital signals. A mechanical or electronic switching device 54 is connected between the A/D converter 50 and the control circuitry 24 to allow a user to selectively monitor either the set point voltage corresponding to the desired set point temperature or the sensor output voltage corresponding to the actual temperature of the external device 12.

Figure 2:
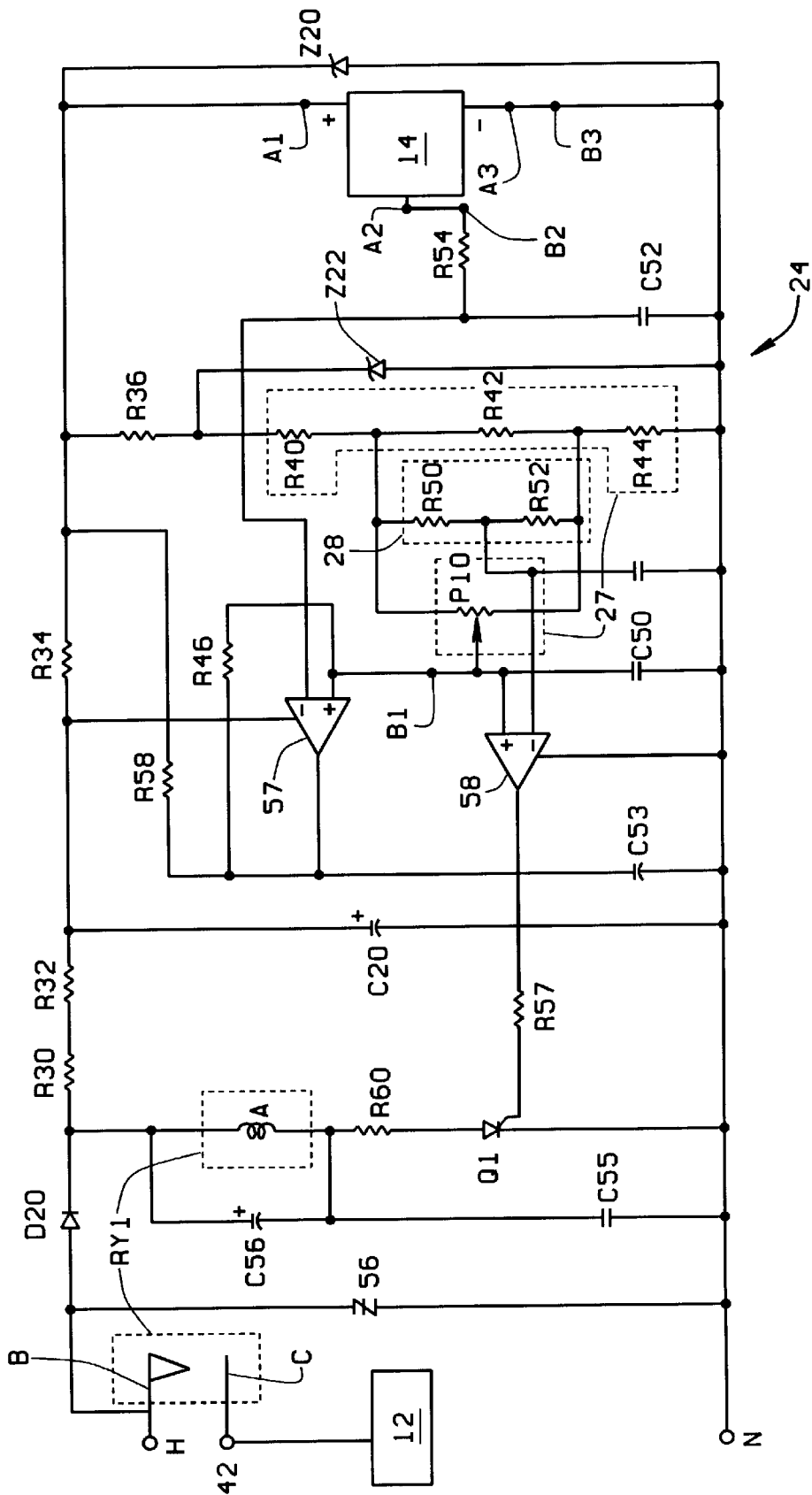
FIG. 2 is a detailed schematic diagram of the sensing device and control circuitry of the present invention.

FIG. 2 is a detailed schematic of the preferred embodiment of the control circuitry 24 set forth generally in FIG. 1. A variable alternating current (VAC) line voltage is applied to hot H and neutral N terminals associated with the control circuitry 24. In the preferred embodiment, 120 VAC line voltage is supplied to the H and N terminals. A metal oxide varistor (MOV) 56 is connected between the H and N terminals as shown in FIG. 2. The MOV 56 is a voltage dependent resistor having a high degree of nonlinearity between its resistance value and the applied line voltage. The MOV 56 provides protection to the control circuitry 24 by absorbing switching transients. The line voltage is rectified by a diode D20, decreased in magnitude by resistors R30 and R32, and filtered by a capacitor C20. Resistor R34 and zener diode Z20 further process this voltage to generate a regulated DC voltage (approximately 6.8 V) to provide power to sensor 14.

Resistor R36 and zener diode Z22 act as a voltage supply to provide a stable reference voltage (e.g., approximately 2.5 volts that does not drift with time or temperature variations.

Adjustable voltage divider 27 in FIG. 2 includes resistors R40, R42 and R44 which dictate the maximum and minimum set point voltages with optimum temperature tracking. As mentioned above, the set point temperature represents the desired set point temperature for the external device 12. Typically, the minimum set point temperature is set at room temperature. Since resistors R40, R42 and R44 all track with temperature, the voltage across R42 is constant. Adjustable voltage divider 27 further includes a variable potentiometer (pot) resistor P10 that allows the set point voltage to be manually adjusted to a voltage level within the range delimited by the maximum and minimum obtainable set point voltages as determined by resistors R40, R42 and R44. When the resistance level of pot resistor P10 is at its minimum value (i.e., set in a fully counterclockwise position), the set point voltage is at a minimum. As the resistance level of the pot resistor P10 increases, the set point voltage increases. A feedback resistor R56 limits the hysteresis of the actual temperature of the external device 12 to ±1° C. or °F. of the set point temperature. As discussed above and below in greater detail, the external device 12 is energized when the resistance of the pot resistor P10 increases from its minimum resistance setting, so long as the magnitude of the set point voltage is greater than or equal to the sensor output voltage.

Fixed voltage divider 28 includes resistors R50 and R52 which produce a fixed reference voltage having a magnitude that is slightly greater than that of the minimum obtainable set point voltage. Preferably, the magnitude of the fixed reference voltage is approximately 5% greater than that of the minimum set point voltage.

A resistor R54 and capacitors C50 and C52 are provided to bypass high frequency noise and switching transients.

As discussed above with respect to FIG. 1, two comparators 57 and 58 are included in control circuitry 24. Comparator 57 provides temperature control by effectively determining whether the actual temperature of the external device 12 is maintained at the desired set point temperature by comparing the magnitude of the set point voltage generated by the adjustable voltage divider 27 to the magnitude of the sensor output voltage generated the sensor 14. Comparator 57 generates an output signal having a first (or high) voltage level when the magnitude of the set point voltage is greater than or equal to the magnitude of the sensor output voltage, and having a second (or low) voltage level when the magnitude of the set point voltage is less than the magnitude of the sensor output voltage.

Comparator 58 provides temperature control by comparing the magnitudes of the set point voltage and the reference voltage to determine whether the external device 12 is turned on or off. When the magnitude of the set point temperature is greater than or equal to the magnitude of the reference voltage, the comparator 58 generates an output signal having a first (or high) voltage level. When the magnitude of the set point voltage is less than the magnitude of the reference voltage, the output signal generated by the comparator 58 has a second (or low) voltage level.

A capacitor C53 is provided to reduce the frequency response of comparators 57 and 58.

Two resistors R57 and R58 provide pull up for the output voltage of the comparators 57 and 58. The output signals generated by the comparators 57, 58 are used to control the activation and deactivation of a thyratron transistor (thyristor) Q1. The thyristor Q1 is used to control the energization of the external device 12. Thyristor Q1 is a bistable semiconductor device that is switched from an off state to an on state or vice versa based upon the output signals of comparators 57 and 58.

More specifically, the gate terminal of thyristor Q1 is connected to output terminals of the comparators 57, 58 such that thyristor Q1 is activated or deactivated based upon the output signals generated by the comparators 57, 58. Thyristor Q1 is activated when both comparators 57, 58 generate output signals having first or high voltage levels. The thyristor remains in an on state allowing for current flow therethrough until either comparator 57 or comparator 58 generates an output signal having a second or low voltage level. The second voltage level reverse biases the thyristor Q1 so that the thyristor Q1 is turned off and blocks current flow. The thyristor Q1 remains deactivated until output signals having the first voltage levels are generated by comparators 57 and 58. A capacitor C55 provides high frequency bypassing for thyristor Q1. Capacitor C55 also allows for increased dv/dt capability for thyristor Q1 so as to increase the rate of change of voltage withstand capability without spurious turn on of the thyristor Q1.

Thyristor Q1, in turn, controls the activation or deactivation of a relay RY1 having a coil A and a magnetic reed switch B. The anode of thyristor Q1 is connected to the relay coil A as shown in FIG. 2. A capacitor C56 is connected in parallel with the relay RY1 to provide a filtered DC voltage to the relay RY1. Relay RY1, in turn, controls the energization of the external device 12 through a switch contact C associated with relay RY1 that is operatively connected to the external device 12. More specifically, when thyristor Q1 is activated, relay RY1 is activated such that the reed switch B is maintained in a closed position in contact with switch contact C. When thyristor Q1 is deactivated, relay RY1 is deactivated such that the reed switch B is maintained in a normally open position as shown in FIG. 2. When the reed switch is in its closed position, the external device is energized by a power source (not shown) associated with the control circuitry 16 via the contact switch C. In other words, the external device 12 is energized when the thyristor Q1 is activated, and deenergized when the thyristor Q1 is deactivated.

A resistor R60 is connected to the anode terminal of the thyristor Q1 to limit peak current through thyristor Q1 from capacitors C56 and C55. Resistor R60 also limits the maximum voltage across capacitor C56.

Figure 3:
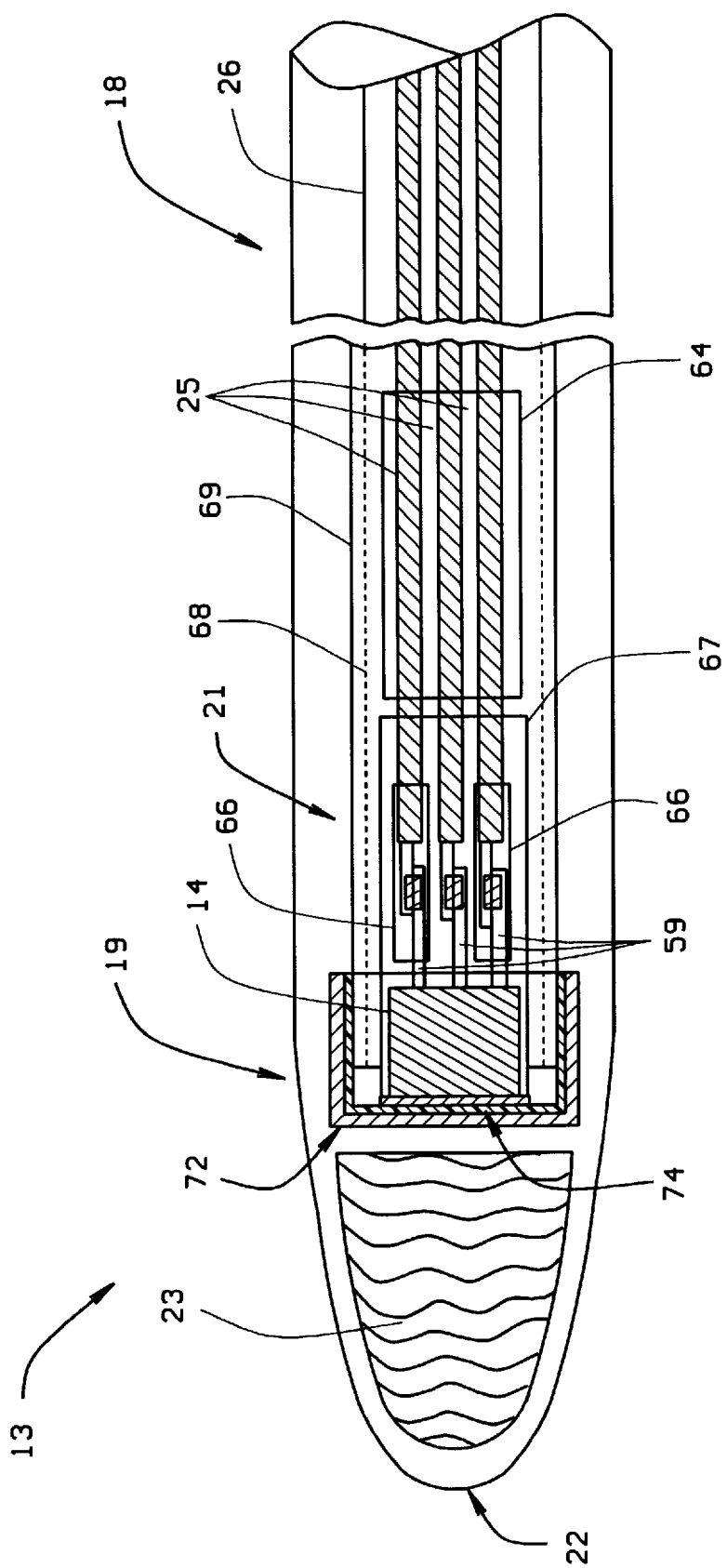
FIG. 3 is a cross-sectional view of the sensing device.

FIG. 3 illustrates a cross-sectional view of the probe 18 in which the sensor 14 is mounted. Sensor 14 includes positive, negative, and neutral leads 59 which are operatively connected to the electronic control circuitry 24 via three wire conductors 25. The leads 59 are soft soldered to the wires 25, and the positive and negative leads are then encased in a heat shrink 66 as shown in FIG. 3. The connection of the leads 59 and wires 25 also can be protected and electrically isolated by positioning irradiated PVC heat reactive tubing (not shown) around the soldered connections, and then wrapping an electrically isolating material (not shown) such as Kapton tape sold by E.I. DuPont de Nemours and Co. around the tubing. Silicone impregnated fiber glass 64 encases a portion of the exposed wire 25 extending between the cable 26 and the sensor 14. The sensor 14, leads 59, heat shrink 66, and a portion of the wires 25 can be disposed inside an electrically isolating material 67 such as Kapton to provide further electrical protection.

As discussed above with respect to FIG. 1, sensor 14 is insulated electrically by the sleeve 21 of insulating material. The sleeve 21 includes a tubular copper body 68 having a tin or nickel plate finish 69 on its exterior surface and a copper cap 72 mounted on one end of the body 68 as shown in FIG. 3. The sensor 14 is disposed inside a portion of the copper body 68 and secured to the copper cap 72 by a copper adhesive 74. The copper adhesive 74 is the type commonly used to seal copper pipe which has received FDA approval and tolerates temperatures to 400°.

The body 68 and cap 72 are further enclosed in an appropriate metal or plastic housing 19 depending on the environmental application. As mentioned above, a thermally conductive, electrically isolating material 23 (e.g., silicone gel) is contained in the tip 22 of housing 19 to improve the thermal coupling between the solid state sensor 14 and the tip 22 of the housing 19.

As mentioned above, the cable 26 containing the wires 26 is connected to the control circuitry 24 via the connector 44. This design of the probe 18 allows for separability of the sensor 14 from the control circuitry 24 so that the control circuitry 24 may be located at a remote location away from the external device 12 to protect the circuitry 24 from the heat generated by the external device 12. Furthermore, this design allows for convenient replacement of sensor 14. The control circuitry is generally mounted in a location where it is easily accessible for testing and adjustment. This design offers significant advantages over the prior art devices such as the capillary device which requires the control circuitry to be permanently mounted on the body of the external device.

The foregoing description is set forth only for illustrative purposes only and is not meant to be limiting. Numerous variations, within the scope of the appended claims will be apparent to those skilled in the art in light of the foregoing description and accompanying drawings. Variations including packaging for specific applications of this device along with added options including upper and lower alarm set points for the effective monitoring of a failure by this temperature control system are expected to be incorporated on a per application basis.

Having thus described the invention, what is claimed and desired to be secured by Letters Patent is:

1. A temperature control system for regulating the temperature of an external device, comprising:

a temperature sensing apparatus disposed in a heat transfer relationship with the external device for generating an output signal having a variable magnitude, the output signal being representative of the actual ambient temperature of the external device;

an adjustable signal generating circuit for generating a set point signal having a manually adjustable magnitude within a predetermined range, the set point signal being representative of a desired temperature for the external device;

a fixed reference signal generating circuit for generating a reference signal having a predetermined magnitude;

first comparison device for comparing the magnitudes associated with the set point signal and the output signal generated by the temperature sensing apparatus, the first comparison device generating an output signal having a first voltage level when the magnitude of set point signal is greater than or equal to the magnitude of the output voltage of the temperature sensing apparatus, and having a second voltage level when the magnitude of the set point signal is less than the magnitude of the output voltage of the temperature sensing apparatus;

second comparison device for comparing the magnitudes associated with the fixed reference signal and the set point signal, the second comparison device generating an output signal having a first voltage level when the magnitude of the set point signal is greater than or equal to the magnitude of the reference signal, and having a second voltage level when the set point signal is less than the reference signal; and means for varying the temperature of the external device by selectively energizing and deenergizing the external device based upon the voltage levels associated with the first and second output signals, the temperature varying means energizing the external device when the output signals of the first comparison device and the second comparison device are at the first voltage levels, the temperature varying means deenergizing the external device when the output signals of the first comparison device or the second comparison device is at the second voltage level.

2. The temperature control system as set forth in claim 1 wherein the temperature varying means includes:

a switching device responsive to the first and second outputs, the switching device allowing for the flow of current therethrough when the output signals of the first comparison device and the second comparison device are at the first/high voltage levels, the switching device blocking the flow of current therethrough when the output signal of the first comparison device or the second comparison device is at the second voltage level;

a relay having a coil operatively connected to the switching device, a switch contact operatively connected to the external device, and a switch having a normally open position and a closed position with respect to the switch contact, the switch being in the normally open when the switching device blocks current flow, the switch being in the closed position when the switching device allows current flow; and a power source operatively connected to the external device when the switch is in the closed position for energizing the external device.

3. The temperature control system as set forth in claim 1 wherein the magnitude of the reference signal is five percent greater than the minimum magnitude obtainable for the set point signal.

4. The temperature control system as set forth in claim 1 further including means for limiting hysteresis of the actual temperature of the external device to ±1° C. or °F. of the desired set point temperature.

5. A temperature control system for regulating the temperature of an external device, comprising:

a temperature sensing device disposed in thermal communication with the external device for generating a variable output voltage proportional to the actual temperature of the external device;

electronic control circuitry operatively connected to the sensing device for selectively energizing and deenergizing the external device to maintain the temperature of the external device at a desired set point temperature;

a regulated DC voltage source connected to the sensing device and the control circuitry for supplying a stable DC reference voltage to the sensing device and the control circuitry;

an adjustable voltage dividing circuit provided for generating a temperature compensated set point voltage within a predetermined range of voltage levels delimited by a maximum voltage level and a minimum voltage level, the set point voltage being proportional to the desired set point temperature for the external device, the adjustable voltage dividing circuit including means for varying the set point voltage within the predetermined range;

a fixed voltage dividing circuit provided for generating a reference voltage having a predetermined voltage level slightly greater than the minimum voltage level obtainable for the set point voltage;

a first comparator for comparing the output voltage of the sensing device to the set point voltage of the adjustable voltage dividing circuit, the first comparator generating a first output voltage having a high level signal when the set point voltage is greater than or equal to the output voltage of the sensing device, and having a low level signal when the set point voltage is less than the output voltage of the sensing device;

a second comparator for comparing the reference voltage of the fixed voltage dividing circuit to the set point voltage, the second comparator generating a second output voltage having a high level signal when the set point voltage is greater than or equal to the reference voltage, and having a low level signal when the set point voltage is less than the reference voltage;

a switching device having a gate terminal operatively connected to output terminals associated with the first comparator and the second comparator, the switching device being in an on state allowing the flow of current therethrough when the first comparator and the second comparator generate the high level output voltages, the switching device being in an off state preventing the flow of current therethrough when the first comparator or the second comparator generates the low level output voltage;

a relay having a coil having a first end connected to an anode terminal associated with the switching device, a switch contact operatively connected to an input terminal associated with the external device, and a switch having a normally open position and a closed position with respect to the switch contact, the switch being in the normally open position when the switching device is in its off state, the switch being in the closed position when the switching device is in its on state; and a power supply operatively connected to the external device via the relay, the power supply being connected between a second end of the coil and the switch, the power supply energizing the external device when the relay is in the closed position.

6. The temperature control system as set forth in claim 5 wherein the voltage level of the reference voltage is five percent greater than the minimum voltage level obtainable for the set point voltage.

7. The temperature control system as set forth in claim 5 wherein the output voltage of the temperature sensing device is proportional to the actual ambient temperature of the external device at a rate of ten millivolts per degree of temperature.

8. The temperature control system as set forth in claim 5 wherein the temperature sensing device includes a solid state sensor having positive, negative and neutral leads extending therefrom, each lead having a wire conductor connected thereto, the wire conductors operatively connecting the temperature sensing device to the control circuitry.

9. The temperature control system as set forth in claim 8 wherein the sensor and a portion of the wire conductors are contained within a thermally conductive and electrically insulating probe, the probe including a tubular copper body having a copper cap mounted at one end so as to define a cavity formed therein, the sensor and portion of the wire conductors being disposed inside the cavity, the copper body having a nickel coating on its exterior surface, the copper body being disposed within an environmentally protected housing, a tip portion of the housing being maintained in physical contact with the external device such that the sensor and the external device are maintained in a heat transfer relationship.

10. The temperature control system as set forth in claim 9 wherein a thermally conductive material is disposed in the housing to improve thermal coupling between the sensor and the external device.

11. The temperature control system as set forth in claim 5 further including a feedback resistor operatively connected between the external device and the temperature sensing device for limiting the hysteresis of the actual temperature of the external device to ±1° C. or °F. of the desired set point temperature.

12. The temperature control system as set forth in claim 10 wherein the means for varying the set point voltage includes a variable resistor that allows for manual setting of the set point temperature.

13. The temperature control system as set forth in claim 10 further including a voltage measuring device for measuring the output voltage of the temperature sensing device and the set point voltage at a plurality of test points in the control circuitry.

14. The temperature control system as set forth in claim 13 wherein the voltage measuring device is an external digital voltmeter.

15. The temperature control system as set forth in claim 14 wherein the voltage measuring device is an internal device including an analog to digital converter provided for converting the output voltage of the temperature sensing device and the set point voltage into related digital signals, a digital display connected to the analog to digital converter for displaying the digital signals thereon, and a switching device connected between the analog to digital converter and the test points for selectively monitoring the set point voltage or the output voltage of the temperature sensing device.

16. A method of controlling the temperature of an external device to maintain actual ambient temperature of the external device at a desired set point temperature including the steps of:

sensing the actual temperature of the external device;

generating a variable voltage having a variable voltage level representative of the actual temperature of the external device;

generating a set point voltage having an adjustable voltage level within a predetermined voltage range extending between a minimum voltage and a maximum voltage which is representative of the desired set point temperature for the external device;

generating a reference voltage having a predetermined voltage level that is greater than the minimum set point voltage;

determining whether the actual temperature of the external device is being at the set point temperature by comparing the voltage levels of the variable voltage and the set point voltage;

determining whether the external device is turned off or on by comparing the voltage levels of the reference voltage and the set point voltage;

energizing the external device when the external device is in the on state and when the actual temperature of the external device is less than or equal to the desired set point temperature; and deenergizing the external device when the external device is in the off state or when the actual temperature of the external device is greater than the desired set point temperature.

17. The method of controlling the temperature of an external device as set forth in claim 16 further including the steps of:

maintaining the external device in the off state when the voltage level of the reference voltage is greater than the voltage level of the set point voltage; and maintaining the external device in the on state when the voltage level of the reference voltage is less than or equal to the voltage level of the set point voltage.

18. The method of controlling the temperature of an external device as set forth in claim 16 further including the step of:

limiting the hysteresis of the actual temperature of the external device to ±1° C. or °F. of the desired set point temperature.

* * * * *